United States Patent [19]
Bernard et al.

[11] Patent Number: 5,121,888
[45] Date of Patent: Jun. 16, 1992

[54] SPINNING REEL WITH A SPOOL DISENGAGEABLE FROM A REAR-MOUNTED DRAG

[75] Inventors: Jean Bernard, Scionzier; Joseph Zanon, Marignier, both of France

[73] Assignee: Mitchell Sports, societe anonyme, Cluses, France

[21] Appl. No.: 561,725

[22] Filed: Aug. 1, 1990

[30] Foreign Application Priority Data

Aug. 9, 1989 [FR] France .................. 89 10993

[51] Int. Cl.⁵ ........................................... A01K 89/027
[52] U.S. Cl. ..................................... 242/245; 242/246
[58] Field of Search ............... 242/241, 242, 245, 246, 242/296, 306, 307, 308, 322

[56] References Cited

U.S. PATENT DOCUMENTS

| | | | |
|---|---|---|---|
| 2,229,470 | 1/1941 | Pezon | 242/307 |
| 4,173,317 | 11/1979 | Hamayasu et al. | 242/246 |
| 4,249,706 | 7/1991 | Haselbauer et al. | 242/247 |
| 4,327,880 | 5/1982 | Dorbandt | 242/318 |
| 4,634,074 | 1/1987 | Ohmori | 242/245 X |
| 4,746,077 | 5/1988 | Toda | 242/245 |
| 4,930,723 | 6/1990 | Toda | 242/245 |
| 4,938,433 | 7/1990 | Toda | 242/245 |

FOREIGN PATENT DOCUMENTS 8631555  6/1987  Fed. Rep. of Germany .

Primary Examiner—Daniel P. Stodola
Assistant Examiner—Michael R. Mansen
Attorney, Agent, or Firm—Ratner & Prestia

[57] ABSTRACT

A fishing reel with disengageable spool is disclosed comprising a first groove and a second groove formed in the vicinity of the front end of the spool support shaft. The spool comprises a resilient key engageable in one or other of the first and second grooves. When the spool is engaged in the first groove, a key of the shaft is engaged in a passage in a rear wall of the spool, preventing relative rotation of the spool on the shaft. When the resilient key is engaged in the second groove, the transverse key swivels freely in a space of the spool, allowing the spool to rotate on the shaft. Disengagement of the spool is obtained by axial translation of the spool on the shaft.

12 Claims, 7 Drawing Sheets

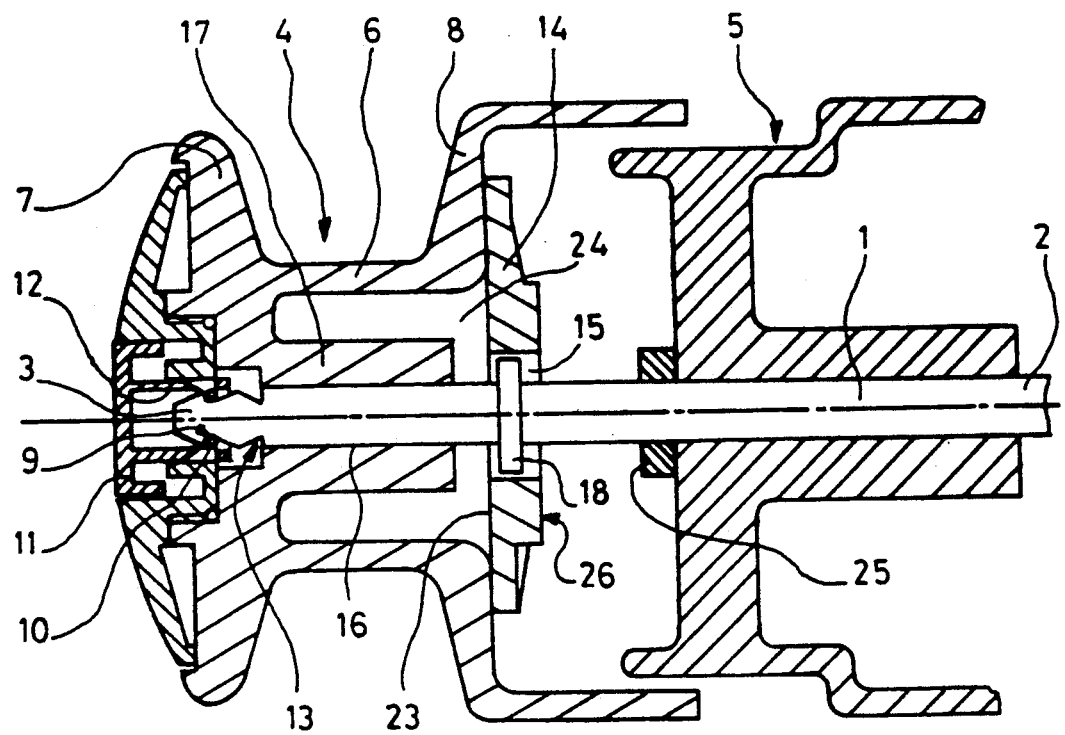
FIG_1
FIG_2

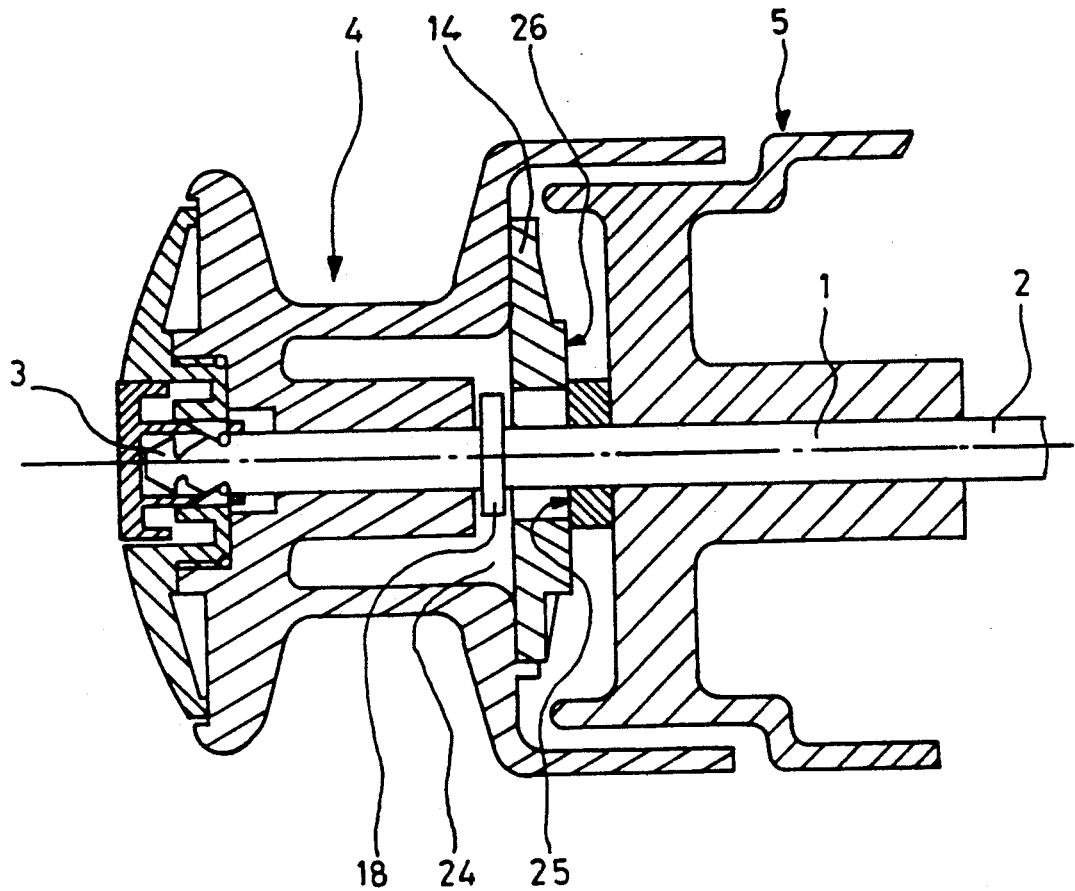
FIG_3

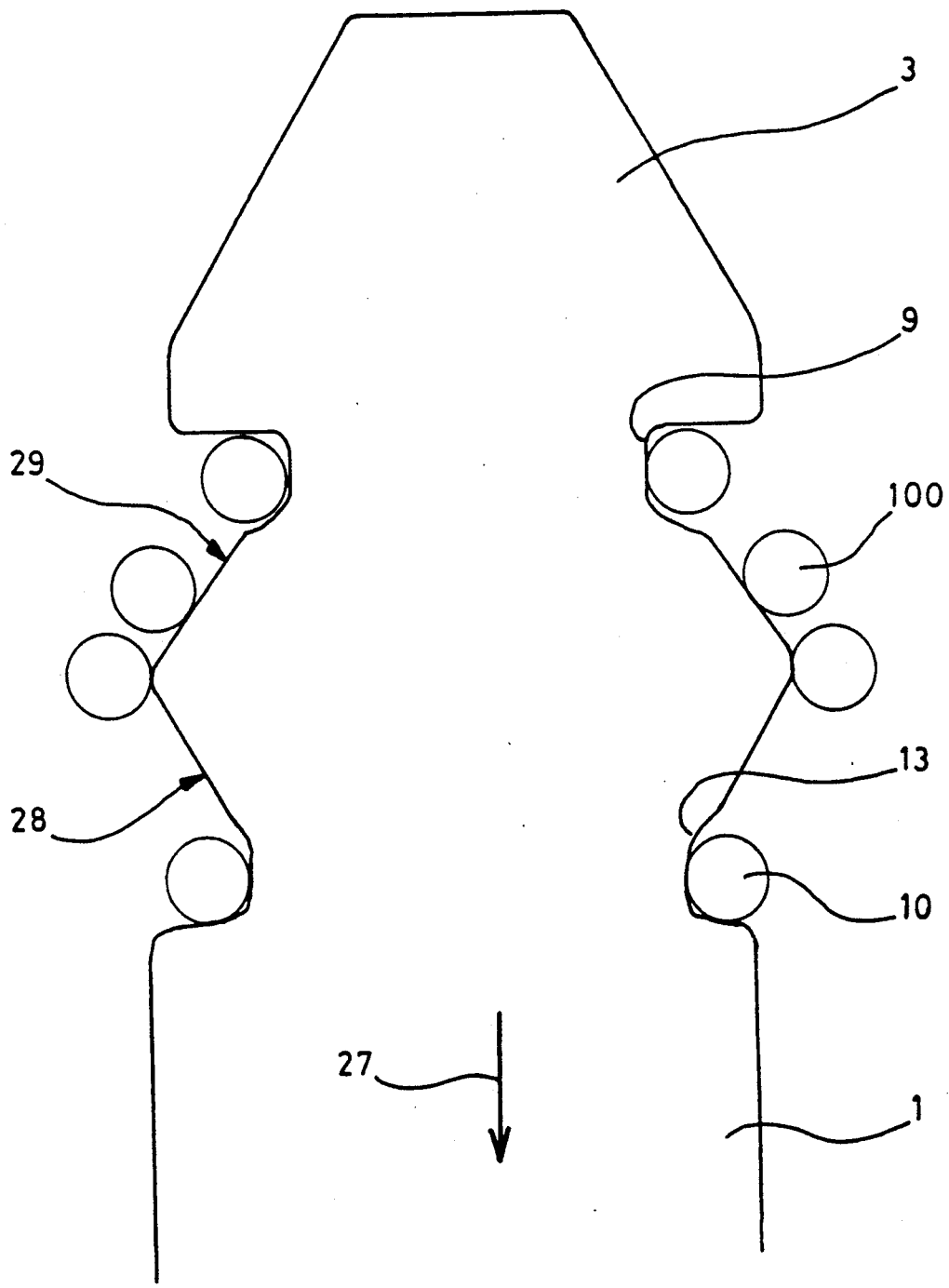
FIG_4

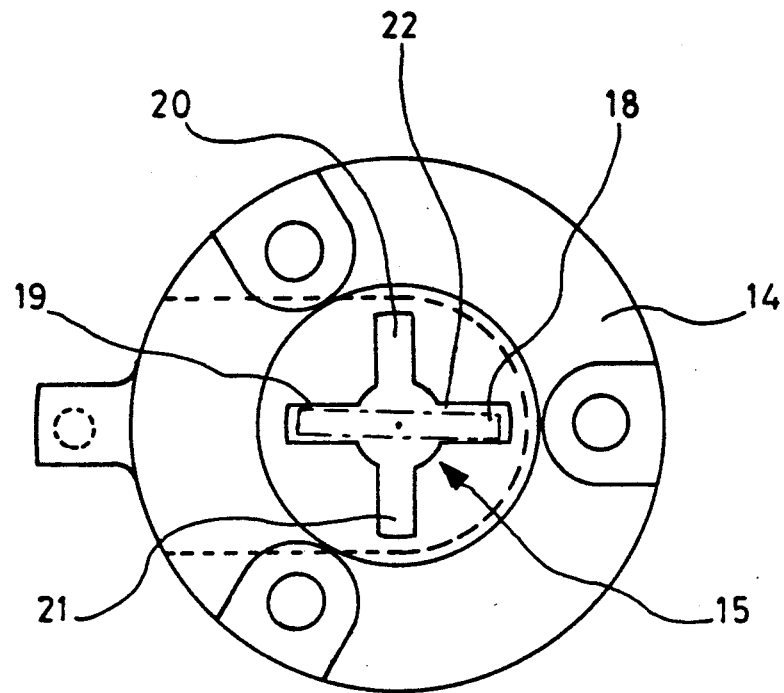
FIG_5
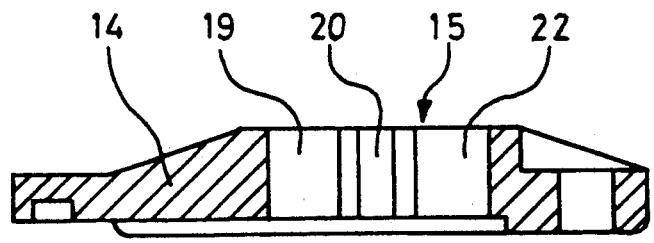
FIG_6

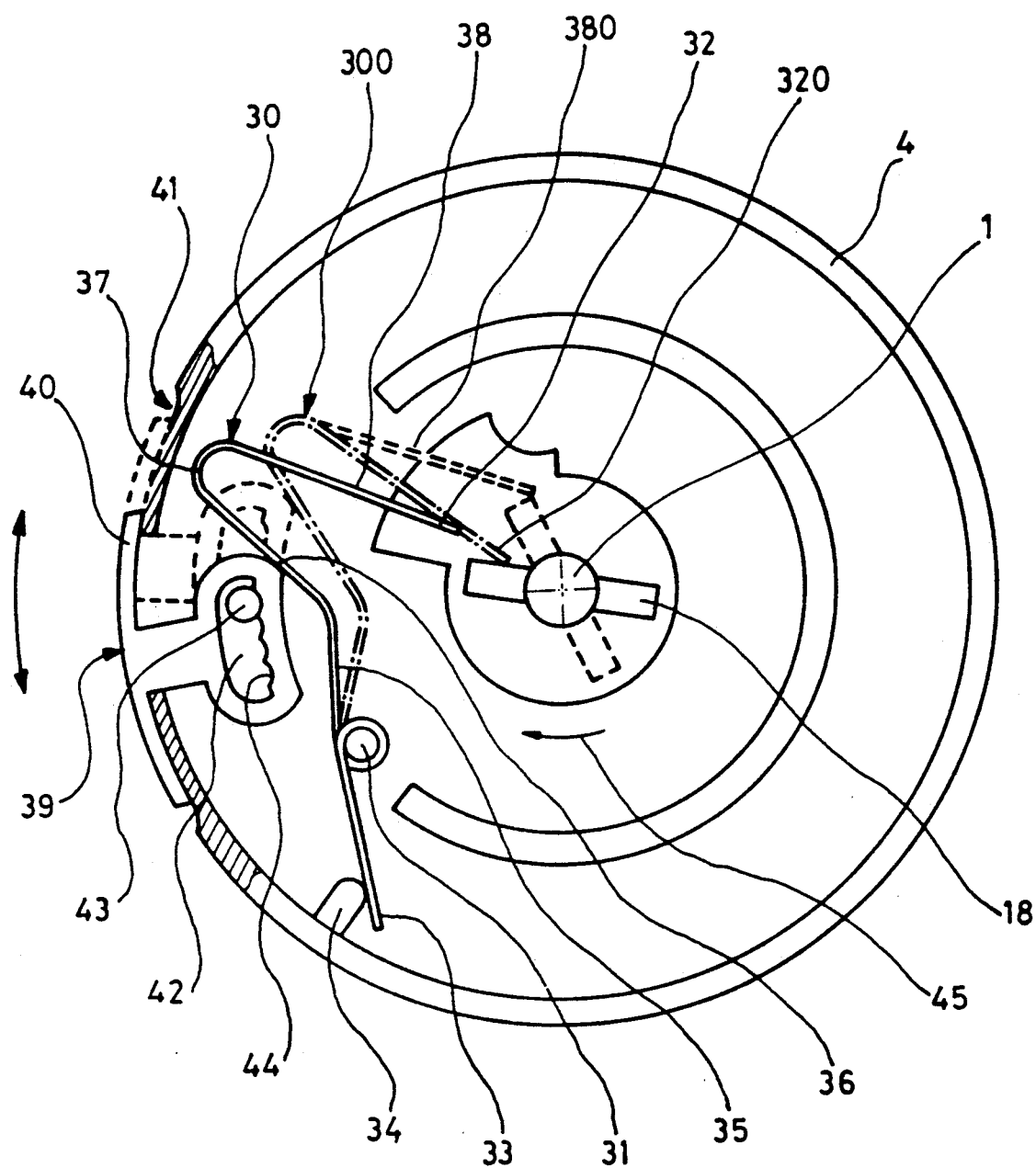
FIG_7

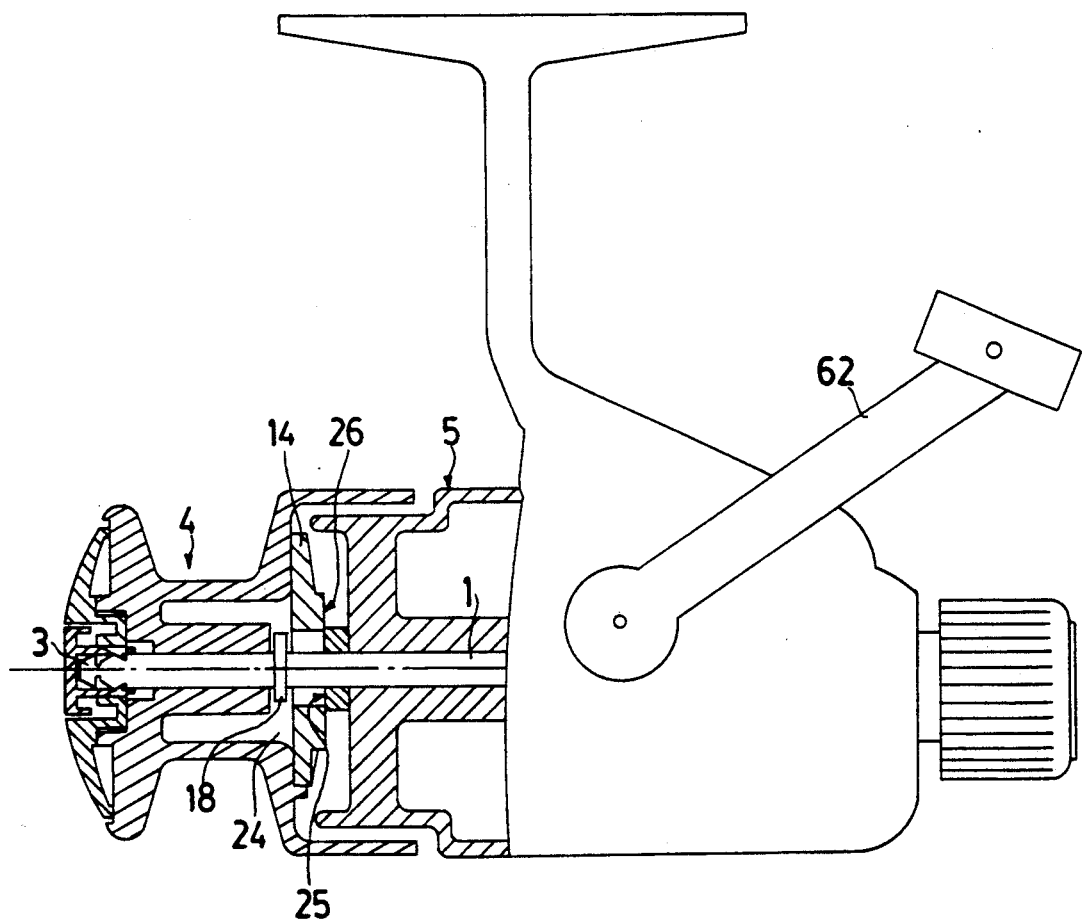
FIG_9

SPINNING REEL WITH A SPOOL DISENGAGEABLE FROM A REAR-MOUNTED DRAG

BACKGROUND OF THE INVENTION

1. Field of the Invention

The present invention relates to reels for fishing rods, of the fixed spool type with line recovery. The invention applies more especially to such a reel whose line reserve, called "spool" or "drum", is a part substantially of revolution formed of two radially extending flanges joined together by a cylindrical hub extending axially from one flange to the other, this spool being removably fitted at the front end of a spool support shaft itself mounted for rotation in the reel case and acted on by a rear brake.

2. Description of the Prior Art

All present-day reels of this type comprise a device for making the spool removable with respect to its support shaft. For example, the document U.S. Pat. No. 2,865,662 describes such a reel with removable spool in which the front end of the spool support shaft comprises a peripheral groove in which is engaged a resilient key fast with the spool. An axial pusher accessible on the front face of the spool comprises a conical internal end which, when pushed in, is engaged between the legs of the key and forces them apart so that the key comes out of the peripheral groove of the support shaft.

Such a device is adapted to different types of fishing, particularly for casting or spinning. During recovery of the line, the line recuperator winds the line on the spool. The tension of the line may be limited and adjusted by adjusting the rear brake which controls the resistant torque between the spool support shaft and the reel case: when the line is pulled with a tension greater than a given value, the rear brake allows the spool support shaft and the spool to rotate while opposing a resistance as a function of the engagement of the brake.

It is however apparent that such a device is not particularly well adapted for fishing with a sinker. In this type of fishing, the rod is laid on a support and if the line recuperator is left in the recovery position, the spool support shaft must be uncoupled from the case to allow the line to unwind freely when the fish has bitten. Under these conditions, the braking torque of the rear brake is adjusted to its minimum so that the line is just held sufficiently to withstand the current of the river or the wind, but adjusting the braking torque again before striking is slow and inconvenient, for it requires long and constraining handling of the rear brake, so that fishermen give up using this method.

If the line recuperator is open, the resistance is then insufficient and the line unwinds from the spool under the action of the water current or the wind.

With present-day equipment, fishermen are reduced to jamming the line, for example under a stone, so as to produce a limited temporary retaining force which disappears when the fish bites. Such a method, however, requires experience and skill, and it lacks reliability.

In the document DE-U-8 631 555 a fishing reel structure has been proposed comprising: a spool support shaft mounted for rotation in a reel case and acted on by a rear brake, a spool fitted removably at the front end of the shaft, means for locking the spool for rotation on its shaft, and a line recovery drum. In this document, the shaft comprises, in the intermediate position, an annular groove (9) and, in the vicinity of its front end, a second annular groove (8), the two grooves being spaced apart form each other with an axial offset; a resilient element (14), fast with the spool, engages in one or other of the grooves for holding the spool on the shaft in a first axial position when the resilient element (14) is engaged in the first groove (9) and for maintaining the spool on the shaft in a second axial position when the resilient element (14) is engaged in the second groove (8); a key (10) fast with the shaft is engaged in a radial groove (11) of the spool for locking the spool for rotation on the shaft when it is in its first axial position; in the second axial position, the key (10) is disengaged from the groove (11) and allows the spool to rotate freely with respect to the shaft. The two grooves (9, 8) have abrupt lateral faces and hold the spool in one or other of the axial positions on the shaft, passage from one axial position to the other requires the actuation of a button (16) which moves the resilient element (14) out of the grooves (9, 8).

Thus the device described in this document makes it possible to free the spool for rotation on its shaft when it is in its second axial position, i.e. when the spool is the furthest away from the drum and when the resilient element (14) is engaged in the second axial position (8) closer to the end of the shaft. Passage from the second axial position to the first axial position, for again locking the spool for rotation on the shaft, requires a button (16) to be actuated.

Such a device is not adapted to using the reel for fishing with a sinker, for it does not allow the braking torque to be conveniently and rapidly adjusted again before striking.

SUMMARY OF THE INVENTION

The problem which concerns the present invention is to allow not only the reel to be uncoupled for rotation on its shaft, as in the document DE-U-8 631 555, but also to allow automatic re-coupling of the spool on the shaft as soon as the fisherman wishes to take hold again of the reel.

Thus, an object of the invention is to provide automatic re-coupling of the spool on its spool support shaft, fixing the spool for rotation on its shaft as soon as the fisherman actuates the crank handle for recovering the line.

Another object of the invention is to produce and adjust an auxiliary braking torque of the spool about its spool support shaft when it is uncoupled.

According to the invention, these functions are provided with particularly simple and inexpensive means, which do not substantially increase the manufacturing cost of reels.

Furthermore, the means used according to the invention are readily adaptable on all types of reels with rear brake and removable spool, without having to modify the internal drive or braking parts of the shaft in the reel body.

To attain these objects as well as others, the reel according to the invention comprises:

a spool support shaft mounted for rotation in the reel case and acted on by a rear brake, a spool fitted removably by reversible axial fixing means to the front end of a shaft, with rotational locking means for locking the spool for rotation with respect to the shaft, a line recovery drum, rotated by a crank handle, a first and a second annular groove formed in the vicinity of the front end of the shaft and spaced apart from each other with axial offset, a resilient element fast with the spool and engaging in one or other of the grooves, for holding the spool on the shaft in a first axial position when the resilient element is engaged in the first groove and for holding the spool on the shaft in a second axial position offset axially from the first position when the resilient element is engaged in the second groove, rotational locking means for locking the spool for rotation on the shaft, when the spool is in the first axial position, the rotational locking means being inoperative and allowing rotation of the spool on the shaft when it is in its second axial position, automatic re-coupling means causing automatic axial movement of the spool from its second axial position to its first axial position by actuating the crank handle of the reel.

In an advantageous embodiment, adapted to reels in which the spool support shaft is subjected to an alternating translational movement in the case during rotation of the crank handle, the invention uses this translational movement for providing automatic re-coupling of the spool on its shaft. For that:

the second groove comprises a ramp in the direction of the first groove for allowing the translational movement of the spool in the direction of the first groove under the action of an axial force urging the spool against the retaining force produced by the resilient element, the spool support shaft is driven with an alternating axial translational movement in the reel case by rotation of the crank handle, a stop, fixed in axial translation with respect to the reel case, allows the spool to move axially over the whole axial travel of the shaft when the spool is in its first axial position; on the other hand, the stop opposes axial movement of the spool with respect to the reel case over a portion of the axial travel of the shaft, so that, in said portion of the axial travel of the shaft, the spool is moved on the shaft to its first axial position. Thus, rotation of the crank handle which causes axial translation of the shaft also causes the spool to move from its second axial position on the shaft to its first axial position on the shaft.

It may be thought that the stop might limit the forward travel of the spool, or limit the rearward travel of the spool.

However, an embodiment may be preferred in which the stop limits the rearward travel of the spool. In fact, this embodiment has the following advantages:

to bring the spool to the second axial position, i.e. in the position in which the spool is free to rotate on the shaft, it is sufficient to push the spool axially by hand towards the reel body by pressing on the accessible front face, which is a very easy and natural gesture, easier than pulling;

for moving the spool from its second axial position to its first axial position, it is sufficient to prevent, over a portion of the axial travel of the spool, the axial rearward movement of the spool, which may be achieved more readily by a stop means bearing on the rear face of the spool.

Thus, in this preferred embodiment:

the groove close to the end of the shaft provides holding in the first axial position in which the spool is fast for rotation with the shaft, and the second groove is further away from the end of the shaft, a front portion of the line recovery drum forms a stop limiting the rearward translational movement of the spool, during the backward movement of the shaft, the spool is retained by the front portion of the drum, the resilient element escapes from the second groove and is inserted in the first groove to put the spool in the first axial position on the shaft.

The reel may advantageously comprise an auxiliary braking member, comprising a friction piece bearing against a part fast for rotation on the shaft, the friction piece being actuated by an adjustment member accessible to the user for adjusting the braking force between the spool and the support shaft.

BRIEF DESCRIPTION OF THE DRAWINGS

Other objects, features and advantages of the present invention will be clear from the following description of particular embodiments, with reference to the accompanying figures in which:

FIG. 1 is a side view in longitudinal section of a reel according to the invention, the spool support shaft being in an advanced position, the spool being in its first axial position locked for rotation;

FIG. 2 shows the reel of FIG. 1 in which the shaft is again in an advanced position, and the reel is in its second axial position or disengaged position;

FIG. 3 shows the reel of FIG. 1 in a position in which the spool support shaft has been moved back to an intermediate position, and the spool is in its second axial position or disengaged position just before returning to its first axial position;

FIG. 4 illustrates schematically the movement of the resilient key with respect to the spool support shaft between the second axial position and the first axial position of the spool;

FIG. 5 illustrates in a front view an added part forming the spool housing in which the key of the spool support shaft is engaged for locking the spool for rotation on its shaft;

FIG. 6 is a longitudinal section of the part of FIG. 5;

FIG. 7 illustrates the construction of an auxiliary braking member according to the invention for braking the spool on its support shaft;

FIG. 9 is a side view of a reel according to the invention.

DESCRIPTION OF THE PREFERRED EMBODIMENTS

Figure 8:
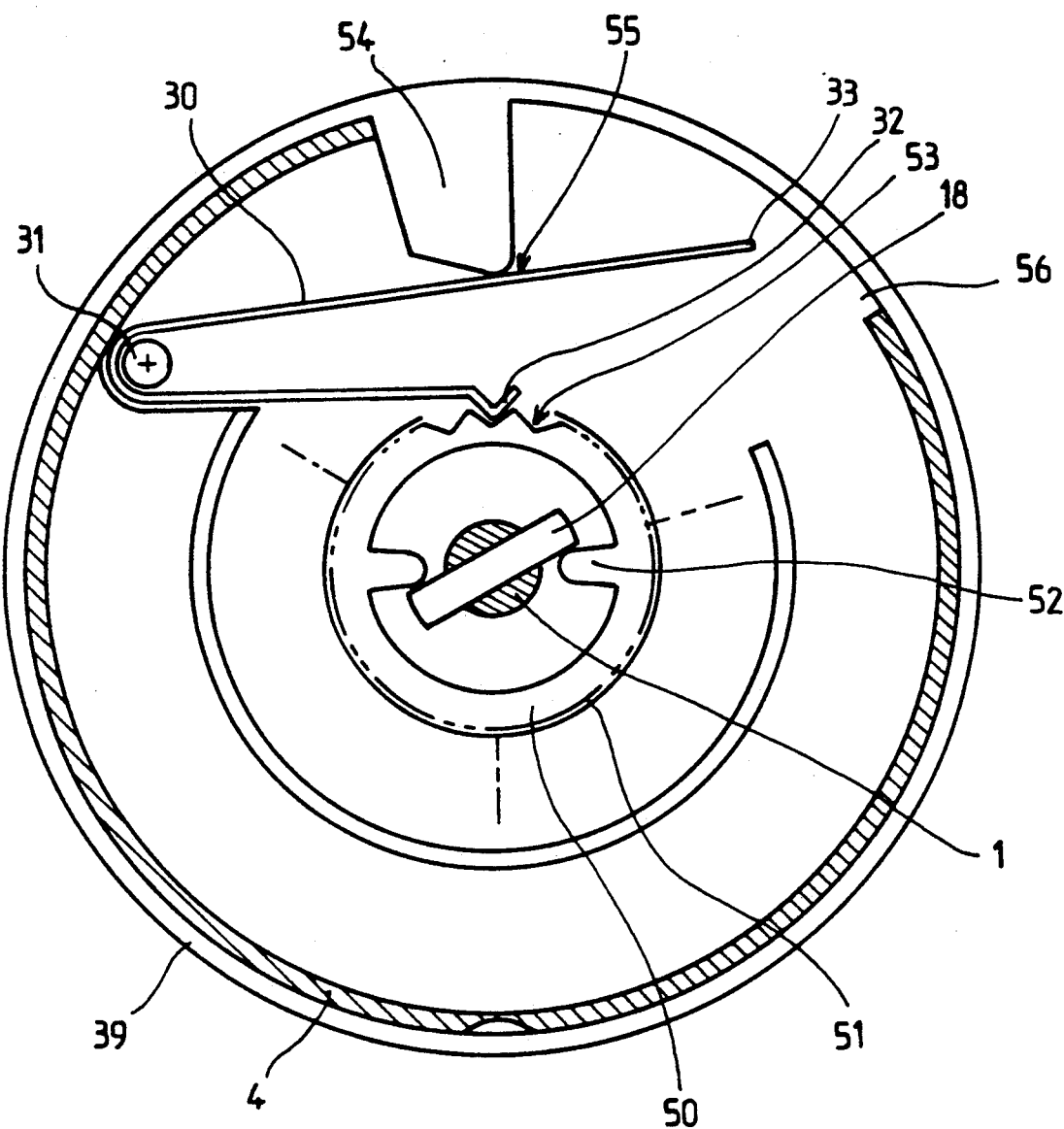
FIG. 8 illustrates another embodiment of the auxiliary braking member of the invention.

FIGS. 1 to 3 show the front portion of a fishing reel according to the invention, comprising a spool support shaft 1 mounted for rotation in a case, not shown in the figures, and acted on by a rear brake which is not shown either. Shaft 1 is journalled in bearings of the reel case at its rear end extending the rear portion 2 shown in the Figures. The front portion 3 of the spool support shaft is free to receive a removable spool 4. A line recovery drum 5 is mounted for rotation on shaft 1 in an axial position which is fixed with respect to the reel case and is rotated by a crank handle not shown. Such a reel structure with a support shaft 1, a spool 4 and a drum 5 is a known conventional structure. During line recovery, spool 4 is locked for translation and rotation with the support shaft 1. Shaft 1 and spool 4 are driven with an alternating axial translational movement whereas drum 5 is driven with an axial rotational movement. By these two combined movements, the recovered fishing line is methodically wound on the central cylindrical hub 6 of the spool joining the two flanges 7 and 8 together.

In a way known per se, spool 4 is of the removable type. As in the known device described in patent U.S. Pat. No. 2,865,662, the front end 3 of the spool support shaft 1 comprises a first peripheral groove 9 in which is engaged a resilient element or key 10, such as shown in the figures, fast with spool 4. An axial pusher 11 is movable in axial translation with respect to spool body 4 and comprises a conical rear end 12 engageable between the legs of the resilient key 10 when pusher 11 is pushed rearwards. By pressing pusher 11 rearwards, its rear end 12 is engaged between the legs of the resilient key 10, forcing said legs of the key apart and causing them to disengage from the first groove 9 of shaft 1. In this position, spool 4 may then be freely removed from shaft 1 by an axial forward translational movement.

For engaging spool 4 on its shaft, it is sufficient to press spool 4 on shaft 1 rearwards. The legs of the resilient key 10 bear on the front end 3 of shaft 1 which advantageously has a conical shape, as shown in the Figures, so that the rearward pressure of spool 4 forces the legs of the resilient key 10 progressively apart which then penetrate into the first groove 9. The front walls of the first groove 9 are advantageously slanted substantially perpendicularly to the longitudinal axis of shaft 1, so that a forward pull exerted on spool 4 does not disengage said spool 4 from its shaft 1.

When the legs of the resilient key 10 are engaged in the first groove 9 of shaft 1, it can be considered that spool 4 occupies its first axial position. According to the invention, the front end 3 of shaft 1 comprises a second annular groove 13, offset axially rearwards with respect to the first groove 9. When the legs of the resilient key 10 are engaged in the second groove 13, it can be considered that spool 4 occupies a second axial position on shaft 1, as shown in FIG. 2.

Spool 4 further comprises a rear wall 14, added and fixed to the rear flange 8, and comprising a central passage 15 through which the spool support shaft 1 passes. A bore 16 is formed in a central portion 17 of the spool body, so that bore 16 fits with a slight clearance on shaft 1.

Shaft 1 and spool 4 are further provided with reciprocal engagement means for locking spool 4 for rotation on shaft 1. In the embodiment shown in the Figures, the rotational locking means comprise a radial rod or key 18 inserted in a diametrical hole through shaft 1, the rod extending on each side from the diametrical hole, these projecting portions being engaged in respective radial housings of the central passage 15 of the rear spool 4 wall 14. The radial housings of the central passage 15 are better shown in FIGS. 5 and 6. In the embodiment shown, the rear wall 14 comprises four radial housings disposed in a cross, namely housings 22 and 19 diametrically opposite each other and housings 20 and 21 also opposite each other, each dimensioned for receiving a projecting portion of the key 18 with slight play. The central portion of passage 15 allows shaft 1 to slide freely. The radial housings 19 to 22 also allow free axial sliding of key 18, but prevent the relative rotation of key 18 with respect to the rear wall 14 when said key 18 is engaged in passage 15.

The front face 23 of the rear wall 14 is separated from the central portion 17 of spool 4 by a space 24 defining a housing in which key 18 may freely swivel in spool 4. Thus, when key 18 is positioned in space 24, spool 4 is free to rotate on the spool support shaft 1.

The relative arrangements of key 18, passage 15, space 24, the two grooves 9 and 13 and the resilient key 10 are chosen so that:

in the first axial position of spool 4, when the resilient key 10 is engaged in the first groove 9 of shaft 1, such as shown in FIG. 1, key 18 of shaft 1 is positioned in passage 15 for locking spool 4 for rotation on shaft 1.

When the resilient key 10 is engaged in the second groove 13 of shaft 1, as shown in FIG. 2, spool 4 being then in its second axial position, key 18 is located in the zone of space 24 for disengaging spool 4 from rotation on the spool support shaft 1.

For fishing with a sinker the user may then choose one of the two positions of spool 4 on its shaft 1. While waiting for the fish to bite, the user pushes spool 4 on its shaft 1 so as to place it in the second axial position in which it is disengaged for rotation with its shaft 1. To strike when the fish has bitten, the user may pull spool 4 to bring it back to its first axial position in which spool 4 is locked for rotation on its shaft and is then subjected to the braking torque of the rear brake.

For automatic passage from the second axial position to the first axial position, for re-coupling spool 4 on its shaft 1, the rear face of the first groove 9 is conical and forms a forwardly slanting ramp as shown in the figures; similarly, the front face of the second groove 13 is conical and forms a rearward slanting ramp. A simple axial pressure of spool 4 thus forces the legs of the resilient key 10 apart for passing from one groove to the other. The resilience of key 10 is however sufficient to hold spool 4 in one or other of the grooves, so that it keeps the position chosen by the user in the absence of a voluntary axial force. The resilient key 10 thus provides a double function: it provides reversible axial locking of spool 4 on its shaft 1, by actuating the pusher 11; and it holds spool 4 in one or other of the axial positions.

In a variant not shown in the figures, the first and second axial positions of spool 4 may be reversed: when the resilient key 10 is engaged in the first groove 9 the closest to the front end 3 of shaft 1, key 18 comes out of passage 15 and is then disposed at the rear of the rear wall 14; when the resilient key 10 is engaged in the second groove 13 the furthest away from end 3 of shaft 1, key 18 is then inserted in passage 15 and locks spool 4 for rotation on its shaft 1.

The previously described embodiment may however be preferred, particularly because it substantially simplifies the means providing automatic return of spool 4 to the first axial position.

To cause automatic return of spool 4 to the first axial position, an automatic re-coupling means is provided actuated by the crank handle 62, as shown in FIG. 9, of the reel when turned by the user, said re-coupling means pushing spool 4 in the direction of the first groove 9.

The embodiment shown in the figures provides for pushing of spool 4 by particularly simple means, taking advantage of the alternating axial translational movement of shaft 1 in the reel case. For that, it is considered that the line recovery drum 5 is an element which is fixed in axial translation with respect to the case of the reel, and a front portion 25 of drum 5 is provided forming a stop for limiting the axial movement of spool 4 rearwards. By appropriately positioning grooves 9 and 13 of shaft 1, the front portion 25 of drum 5 and the corresponding rear portion 26 of spool 4, when shaft 1 moves backwards in the reel case, with spool 4 in its second axial position, spool 4 comes to bear on the front portion 25 of drum 5 during a portion of the axial travel of shaft 1 and then slides on the spool support shaft 1 over a sufficient distance for the legs of the resilient key 10, initially housed in the second groove 13 and progressively forced apart by the action of the front wall of second groove 13, to reach the first groove 9. This movement is shown schematically in greater detail in FIG. 4: with this spool initially in its second axial position, key 10 is engaged in the second groove 13. During backward movement of shaft 1 in the direction shown by arrow 27, spool 4 progressively draws nearer drum 5 and reaches the position shown in FIG. 3 in which its rear portion 26 comes into contact with the front portion 25 of drum 5. Shaft 1 then continues its backward movement by sliding in bore 16 of the spool. During this backward movement, key 10 moves away while bearing on the front wall 28 of the second groove 13 and reaches the beginning of the rear wall 29 of the first groove 9. The backward movement of shaft 1 must allow the resilient key 10 to freely reach the rear wall 29 of the first groove 9, for example in position 100 shown in FIG. 4. From this position, the resilience of the resilient key 10 bearing on the conical rear face 29 by itself ensures sliding of spool 4 to its first axial position in which key 10 is inserted in the first groove 9, so that spool 4 escapes from the front stop 25 of drum 5.

In the embodiment shown, the front portion 25 of drum 5 is formed by a nut fast with drum 5 and whose axial position may be adjusted with respect to the drum. This possibility of adjustment avoids the defects due to the relatively wide spread of dimensioning of the parts, introducing a considerable variation of the distance between grooves 9 and 13 and portion 25. Thus, this distance is adjusted so that, when going over from the second axial position to the first axial position, the resilient key 10 always reaches the position 100 shown in FIG. 4.

FIG. 7 illustrates an auxiliary braking device for adjusting the braking force between spool 4 and the spool support shaft 1 when spool 4 is in the second axial position in which it may rotate about shaft 1. This device comprises a friction piece, fast with the spool, bearing against a portion of shaft 1, the friction piece being actuated by an adjustment accessible to the user for adjusting said friction force.

In the embodiment shown, the friction piece is a resilient rod 30, articulated on an off-centred axial pivot 31 of spool 4, and comprising a free end 32 disposed in the vicinity of shaft 1. An intermediate portion of rod 30 is wound about the axial pivot 31 and is continued beyond the pivot by a bearing portion 33 whose end bears on a boss 34 of the spool body.

The end 32 of the resilient rod 30 penetrates into space 24 of FIG. 3, which space is provided for housing the projecting portion of key 18 and allowing rotation of spool 4.

From pivot 31, which is disposed in an intermediate zone of the spool body as shown in the figure, rod 30 is continued, opposite its bearing portion 33, by a transverse portion 35 which is connected by a curved portion to a portion 36 which develops obliquely in the direction of the peripheral wall of the spool, itself connected by a bend 37 to a radial portion 38 developing in the direction of shaft 1 as far as end 32.

A slide 39 allows the position of the resilient rod 30 to be adjusted. Slide 39 comprises an external portion 40 accessible from outside the spool and bearing against the external face 41 of spool 4. The slide comprises an internal portion, connected to the external portion 40, by a radial connection zone passing through an aperture of the outer peripheral wall of spool 4. The internal slide portion comprises a coaxial arcuate aperture 42 through which passes an axial pivot 43 fast with spool 4. Aperture 42 comprises an arcuate bearing wall 44, with catches. The internal portion of slide 39 bears against the external face of the oblique portion 36 of resilient rod 30. Thus, slide 39 is mounted for sliding in annular coaxial guides of spool 4, and the annular guides being formed by the external face 41 of the spool, by the aperture through which the radial connecting portion of the slide passes and by pivot 43 against which wall 44 bears. The resilient rod 30 pushes the slide 39 resiliently back outwardly away from shaft 1 so that its wall 44 bears against the axial spool pivot 43. Slide 39 may thus slide in its guides between a first position shown with continuous lines in the figure and a second position shown with broken lines, the slide being held in each of the endmost positions or in the intermediate positions by the fact that pivot 43 is engaged in the catches of the bearing wall 44. The resilient rod 30 is shaped so that its oblique portion 36 permanently bears against the internal portion of slide 39, whatever the position of the slide.

When slide 39 is in its first position shown with continuous lines, the resilient rod 30 is relatively distant from shaft 1, in its position shown with continuous lines in FIG. 7. In this position, the end 32 of the resilient rod 30 is away from shaft 1 and is not reached by the projecting portions of key 18. On the other hand, when slide 39 is in its second position shown with broken lines, rod 30 is then pushed in the direction of shaft 1 to a position shown with a chain dotted line under reference 300, and its end 32 then takes up a position 320 close to shaft 1. In this position, the end 32 of the rod bears on the projecting portions of key 18 during rotation of spool 4 with respect to shaft 1.

At each passage of a projecting portion of key 18, the latter pushes the resilient rod 30 into position 380 shown with broken lines, and then causes a braking pulse between spool 4 and shaft 1. By adjusting slide 39, the braking pulse may be varied. For example, for relative rotation of key 18 with respect to spool 4 such as shown in FIG. 7 by arrow 45, the chain dotted line position 300 of rod 30 will cause a maximum braking torque, whereas the initial position shown with continuous lines will produce a minimum, even zero, braking torque. The device further provides a sound warning, by the fact that the impacts of key 18 on the end 32 of rod 30 are audible and warn the fisherman that the line is beginning to unwind by rotation of spool 4, indicating that the fish has bitten.

FIG. 8 illustrates another embodiment of the auxiliary braking device of the invention, for adjusting the braking force between spool 4 and the spool support shaft 1 when spool 4 is in its second axial position in which it may rotate about shaft 1. In this embodiment, a friction piece is also provided in the form of a resilient rod 30 actuated by an adjustment member 39 accessible to the user. The friction piece 30 is articulated, in its central zone, about an off-centred axial pivot 31 of the spool. A first end 32 of the resilient rod 30 bears radially on the peripheral surface 53 of a loose ring 50 mounted for rotation in an axial bore 51 of spool 4. The loose ring 50 comprises inner studs such as stud 52, abutting against the key 18 of shaft 1, for locking ring 50 and shaft 1 together for rotation when spool 4 is in its second axial position. The resilient rod 30 comprises a bearing zone 55, close to its second end 33, said bearing zone 55 bearing resiliently against an adjustment member 39. The adjustment member 39 is a circular flexible ring fitted on the periphery of spool 4 and having a radial centripetal lug 54 passing through an annular aperture 56 in the spool body and bearing radially against said bearing zone 55 of the resilient rod 30. The bearing zone 55 of resilient rod 30 forms a chord disposed in a hollow inner zone of the spool body 4, as shown in FIG. 8. Thus, by a circular movement of ring 39, lug 54 is moved: in the median position shown in FIG. 8, lug 54 bears on the middle of the chord formed by the bearing zone 55 of resilient rod 30, producing a minimum bearing force of rod end 32 on the loose ring 50; on the other hand, by moving lug 54 to the right, it pushes the bearing zone 55 back and increases the bearing force exerted by the opposite end 32 of the resilient rod 30 on the loose ring 50, thus increasing the auxiliary braking force.

Advantageously, on at least one peripheral portion 53 of the loose ring 50, toothed portions are provided producing a noise during braking by the auxiliary braking member.

This embodiment of FIG. 8 provides a smoother braking torque and a more agreeable sound warning. Furthermore, the adjustment member 39 in the form of a circular ring is easier to handle for adjusting the tension of the resilient rod 30.

The present invention is not limited to the embodiments which have been explicitly described, but includes the different variants and generalizations thereof contained within the scope of the following claims.

What is claimed is:

1. Fishing reel with rear brake, comprising:
a spool support shaft mounted for rotation in the reel case and acted on by a rear brake,
a spool fitted removably to the front end of said shaft, with rotational locking means for locking the spool for rotation with respect to the shaft,
a line recovery drum, rotated by a crank handle,
a first and a second annular groove formed on said shaft near the front end of the shaft, said first and second annular grooves spaced apart from each other with axial spacing along the shaft,
a resilient element fast with the spool and engaging in one or the other of the grooves, for holding the spool on the shaft in a first axial position when the resilient element is engaged in the first groove and for holding the spool on the shaft in a second axial position offset axially from the first position when the resilient element is engaged in the second groove,
rotational locking means for providing rotational locking between the spool and the shaft, when the spool is in the first axial position,
the rotational locking means being inoperative and allowing rotation of the spool on the shaft when the spool is in its second axial position,
wherein the reel has a crank handle and means for transforming the rotational movement of the crank handle into a translational movement of the spool in the direction of the first groove, so that actuating the crank handle of the reel causes movement of the spool from its second axial position to its first axial position.

2. The reel as claimed in claim 1, wherein:
the second groove comprises a ramp in the direction of the first groove for allowing the translational movement of the spool in the direction of the first groove under the action of an axial force urging the spool against the retaining force produced by the resilient element,
the spool support shaft is driven with an alternating axial translational movement in the reel case by rotation of the crank handle,
a stop, prevented from movement, with respect to the reel case, along the axial direction parallel to the spool support shaft, allows the spool to move axially over the whole axial travel of the shaft when the spool is in its first axial position but opposes axial movement of the spool with respect to the reel case over a portion of the axial travel of the shaft when the spool is in its second axial position, so that, in said portion of the axial travel of the shaft, the spool is moved on the shaft to its first axial position.

3. Fishing reel with rear brake, comprising:
a spool support shaft mounted for rotation in a reel case and acted on by a rear brake,
a spool fitted removably to the front end of said shaft,
a line recovery drum, rotated by a crank handle,
a first and a second annular groove formed on said shaft near the front end of the shaft, said first and second annular grooves spaced apart from each other with axial spacing along the shaft,
the first groove is closest to the end of the shaft and the second groove is further away from the end of the shaft,
a resilient element fast with the spool and engaging in one or the other of the grooves, for holding the spool on the shaft in a first axial position when the resilient element is engaged in the first groove and for holding the spool on the shaft in a second axial position offset axially from the first position when the resilient element is engaged in the second groove,
rotational locking means for providing rotational locking between the spool and the shaft, when the spool is in the first axial position,
the rotational locking means being inoperative and allowing rotation of the spool on the shaft when in its second axial position,
wherein the reel has a crank handle and means for driving the spool support shaft with an alternating axial translational movement in the reel case by rotation of the crank handle,
the second groove comprises a ramp in the direction of the first groove for allowing the translational movement of the spool in the direction of the first groove under the action of an axial force urging the spool against the retaining force produced by the resilient element,
a front portion of the line recovery drum forms a stop which allows the spool to move axially over the whole axial travel of the shaft when the spool is in its first axial position but opposes axial movement of the spool with respect to the reel case over a portion of the axial travel of the shaft by limiting the rearward translational movement of the spool when the spool is in its second axial position, so that, in said portion of the axial travel of the shaft, the spool is moved on the shaft to its first axial position, during the backward movement of the shaft, the spool is retained by the front portion of the drum, the resilient element moves away from the second groove and is inserted in the first groove to put the spool in the first axial position on the shaft.

4. The reel as claimed in claim 3, comprising a front drum portion whose axial position is adjustable with respect to the drum for accommodating the variations of dimensions between the drum and the front end of the shaft.

5. Fishing reel with rear brake, comprising:
   a spool support shaft mounted for rotation in a reel case and acted on by a rear brake,
   a spool fitted removably to the front end of said shaft,
   a line recovery drum, rotated by a crank handle,
   a first and a second annular groove formed on said shaft near the front end of the shaft, said first and second annular grooves spaced apart from each other with axial spacing along the shaft,
   a resilient element fast with the spool and engaging in one or the other of the grooves, for holding the spool on the shaft in a first axial position when the resilient element is engaged in the first groove and for holding the spool on the shaft in a second axial position offset axially from the first position when the resilient element is engaged in the second groove,
   rotational locking means for providing rotational locking between the spool and the shaft, when the spool is in the first axial position,
   the rotational locking means comprises a transverse key fast with the shaft and engaged in a passage formed in the spool when the spool is in the first axial position, said key escaping from the passage in the second axial position,
   the rotational locking means being inoperative and allowing rotation of the spool on the shaft when in its second axial position,
   wherein the reel has a crank handle and means for driving the spool support shaft with an alternating axial translational movement in the reel case by rotation of the crank handle,
   the second groove comprises a ramp in the direction of the first groove for allowing the translational movement of the spool in the direction of the first groove under the action of an axial force urging the spool against the retaining force produced by the resilient element,
   a stop, allows the spool to move axially over the whole axial travel of the shaft when the spool is in its first axial position but opposes axial movement of the spool with respect to the reel case over a portion of the axial travel of the shaft when the spool is in its second axial position, so that, in said portion of the axial travel of the shaft, the spool is moved on the shaft to its first axial position.

6. The reel as claimed in claim 5, wherein said first groove comprises a ramp in the direction of the second groove so that, during the re-coupling movement, the spool moves away from the fixed stop under the action of the resilient element.

7. The reel as claimed in claim 6, wherein the spool comprises a rear added wall having a passage and radial housings receiving the means for locking the spool for rotation, the rear wall adjacent to a space of larger diameter in which the means for locking the spool for rotation may freely rotate in the spool without opposing its rotation.

8. Fishing reel with rear brake, comprising:
   a spool support shaft mounted for rotation in the reel case and acted on by a rear brake,
   a spool fitted removably to the front end of said shaft, with rotational locking means for providing rotational locking between the spool and the shaft,
   said spool further comprising an auxiliary braking member, with a friction piece which bears against a part fixed for rotation on the shaft and which is actuated by an adjustable member external to said fishing reel and accessible to the user for adjusting the friction force,
   a line recovery drum, rotated by a crank handle,
   a first and a second annular groove formed on said shaft near the front end of the shaft, said first and second annular grooves spaced apart from each other with axial spacing along the shaft,
   a resilient element fast with the spool and engaging in one or the other of the grooves, for holding the spool on the shaft in a first axial position when the resilient element is engaged in the first groove and for holding the spool on the shaft in a second axial position offset axially from the first position when the resilient element is engaged in the second groove,
   rotational locking means for providing rotational locking between the spool and the shaft, when the spool is in the first axial position,
   the rotational locking means being inoperative and allowing rotation of the spool on the shaft when in its second axial position,
   wherein the reel has a crank handle and means for transforming the rotational movement of the crank handle into a translational movement of the spool in the direction of the first groove, so that actuating the crank handle of the reel causes movement of the spool from its second axial position to its first axial position.

9. The reel as claimed in claim 8, wherein the friction piece is a resilient rod articulated about an axial pivot of the spool, said axial pivot parallel to and off-centered from the axis of the shaft, and comprising a free end bearing radially on a key of the shaft, the intermediate resilient rod portion being connected to an adjustment member for adjusting the rotation of the rod about the pivot, said resilient rod producing simultaneously a braking effect and a noise effect.

10. The reel as claimed in claim 9, wherein:
    the adjustment member is a slide mounted for sliding in annular guides of the spool,
    the slide comprises a actuate aperture through which passes an axial pivot fast with the spool,
    the aperture comprises a bearing wall with catches,
    the slide is pushed resiliently away from the shaft by the intermediate portion of the resilient rod, the bearing wall coming to bear against the axial pivot, so that the slide is retained and braked by engagement of the pivot in the catches of the bearing wall.

11. The reel as claimed in claim 8, wherein the friction piece is a resilient rod whose central zone is articulated about an axial pivot of the spool, said axial pivot parallel to and off-centered from the axis of shaft 1, a first end of which comes to bear radially on a loose ring mounted for rotation in an axial bore of the spool, and a bearing zone of which, close to its second end, bears resiliently against a movable adjustment member for adjusting the bearing force of the resilient rod on the loose ring, said loose ring comprising inner studs abutting against a key of the shaft for locking the ring and the shaft together for rotation when the spool is in its first axial position.

12. The reel as claimed in claim 11, wherein:

the loose ring comprises at least one toothed peripheral surface portion producing a noise during braking by the auxiliary braking member, the adjustment member is a flexible circular ring fitted to the periphery of the spool and having a centripetal radial lug passing through an annular aperture in the spool body and bearing radially against said bearing zone of the rod.

* * * * *